May 6, 1958 V. M. HELMS 2,833,044
DEPTH GAUGE ATTACHMENT FOR FISHING RODS
Filed Aug. 14, 1956 2 Sheets-Sheet 2
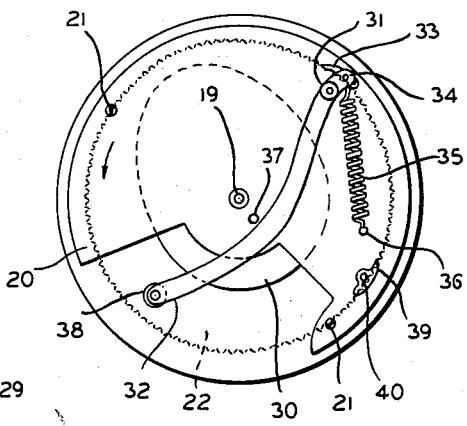
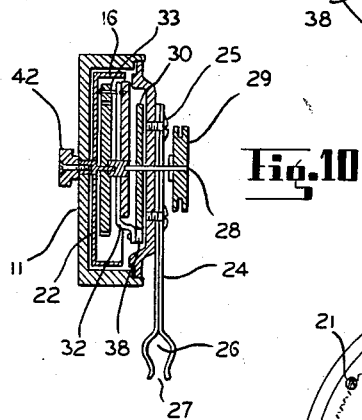
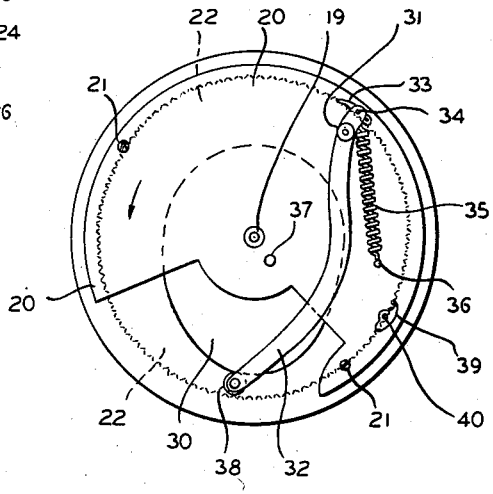
INVENTOR.
VORICE M. HELMS
BY
PARKER & CARTER
ATTORNEYS

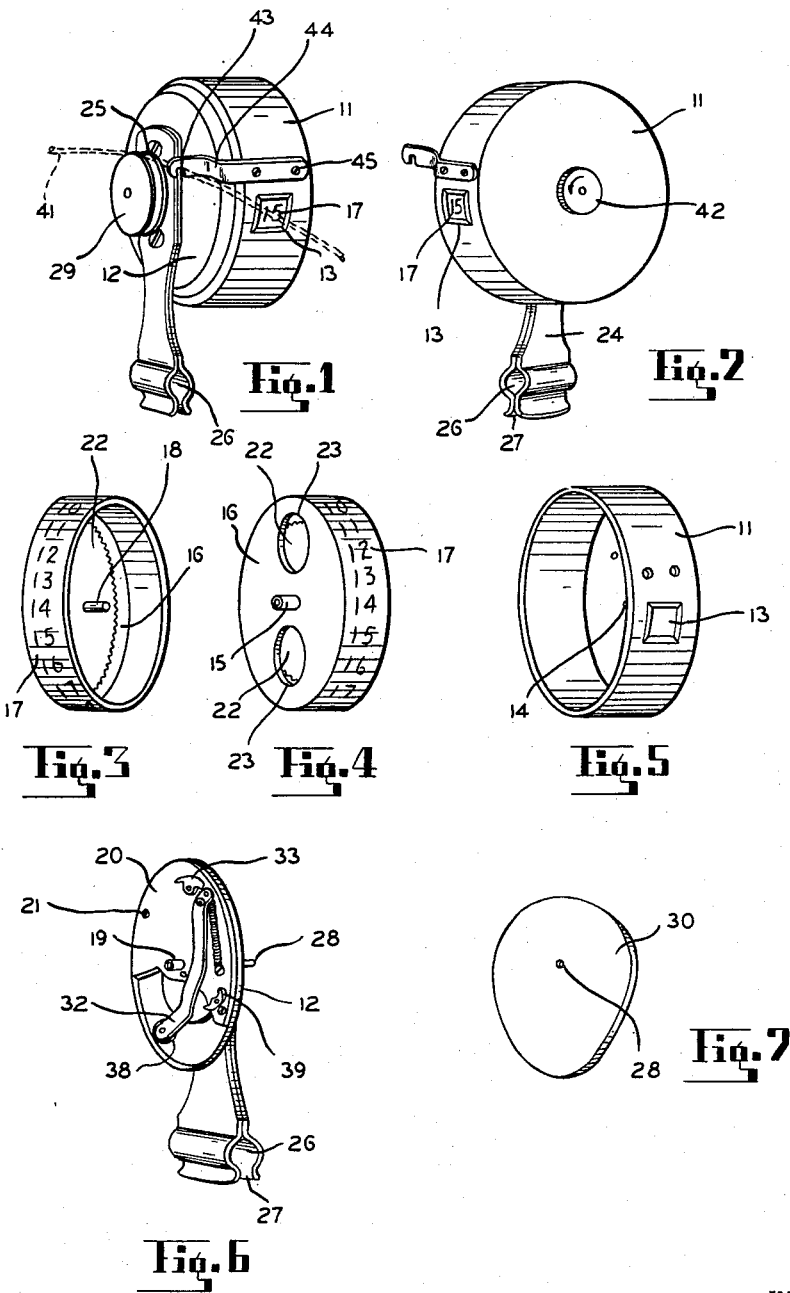

United States Patent Office 2,833,044
Patented May 6, 1958

2,833,044

DEPTH GAUGE ATTACHMENT FOR FISHING RODS

Vorice M. Helms, Milwaukee, Wis.

Application August 14, 1956, Serial No. 603,937

6 Claims. (Cl. 33—129)

My invention relates to improvements in depth gauges especially adapted for fishermen.

It is manifest to anyone familiar with fishing, that it is often quite necessary and desirable to determine the depth of the water, so that the bait or lure may be suspended at the proper distance from the bottom to properly attract the fish.

The principal object of my invention is to provide a device that will automatically and visibly record the number of feet of line expended from the reel.

A further object of my invention is to provide a depth gauge device adaptable for attchable to a conventional fishing pole, and in combination with a fishing line and reel attached to the pole, but which may be used without interference with normal fishing operations.

Another object of my invention is to provide a device of the kind described which may be easily applied or removed as an accessory to a fishing pole.

Still another object of my invention is to provide a device which will visibly measure and indicate the number of feet of line passing over a given point.

A further object of my invention is to provide a device that may have its readings easily reset to a zero starting point, after the device has performed its function.

Other and further objects of my invention will become more apparent as the description proceeds, when taken in conjunction with the drawings, in which—

Figure 1 is a perspective view of the assembled gauge device, with a pulley and line guide attached thereto, and showing the means of attaching the mounting bracket to the device;

Figure 2 is a perspective view of the device from its opposite side, showing the centrally disposed knurled nut for resttting the numerically marked dial;

Figure 3 is a detail perspective view of the gauge dial having numerals on its outer periphery;

Figure 4 is a detail perspective view of the gauge dial from its opposite side;

Figure 5 is a detail perspective view of the outer shell or housing of the device showing the square opening through its outer face, to afford visibility of the numerals on the dial;

Figure 6 is a detail perspective view of the back plate supporting various movable parts of the device;

Figure 7 is a detail perspective view of the eccentric cam forming a part of the mechanism;

Figure 8 is an enlarged side view showing the measuring and indicating mechanism with the actuating arm disengaged from the peripheral surface of the eccentric cam;

Figure 9 is a view similar to that shown in Figure 8, but with the actuating arm in engagement with the "high" point of the eccentric cam; and Figure 10 is a cross-sectional view in reduced scale of the entire device, showing the component parts in assembled relation.

Similar characters of reference indicate corresponding parts throughout the several views, and referring now to the same, a circular outer shell acts as a housing, in combination with a back plate 12, when engaged therewith. The shell 11 has an opening 13 through its peripheral flange, and a bearing 14 at its center, which receives a tubular shaft 15 fixed to and extending outward from a dial disc 16. The dial disc has a outer flange, provided with a series of numerals 17 about its outer periphery, and rotatable within the flanged periphery of the shell 11. The numerals 17 are in alignment with the opening 13 in the flange of shell 11, so as to be viewed successively through the latter as the dial is rotated.

Opposite from the tubular shaft 15 on dial 16 is an inwardly extended shaft 18, which is rotatably mounted in short hollow shaft 19 extending through a plate 20 attached to the back plate 12 by screws 21. The hollow shaft 19 terminates in a shaft 28 projecting outward through the back plate 12, and having a flanged pulley 29 fixed on its outer end.

The back plate 12 has a mounting bracket 24 attached thereto by screws 25, which bracket consists of two members which project downward and are radially formed at 26 to form an open clamp 27 for yielding engagement with a fishing rod (not shown).

A ratchet wheel 22 having ratchet teeth on its outer periphery is fixed on shaft 18 adjacent the inner face of the dial member 16 and concentric with the latter. Openings 23 may extend through the webbed portion of the dial 16, as shown in Figure 4.

An eccentric actuating cam 30 is mounted on the shaft 28 against the inner side of the back plate 12. Cam 30 rotates with shaft 28. The plate 20, attached to the back plate 12 by screws 21, as previously mentioned, provides a partial enclosure or housing for the cam 30. This plate 20 carries a pivot 31 on which an actuating arm 32 is rockably mounted near one end of the latter. The short end of arm 32 supports a pawl 33 pivotally mounted at 34 on said arm. The latter arm is urged into the position shown in Figure 8 by the spring 35 attached to the short end of said arm, and at the other end to the plate 20 at 36, thereby normally urging the long end of actuating arm 32 against the stop pin 37, which projects outward from said plate. The long end of the arm 32 has a roller 38 at its extremity for engagement with the outer periphery of the eccentric cam 30, as shown in Figure 9.

An auxiliary retaining pawl 39 is pivoted at 40 on the plate 20. Both of the pawls 33 and 39 are normally urged toward the ratchet teeth on the ratchet wheel 22 by coil spring (not shown) on their pivots. When the flanged pulley 29 is caused to revolve by the fishing line 41, held in engagement therewith as shown in phantom in Figure 1, the pulley 29 will cause the cam 30 to revolve. When the high point of the cam 30 contacts the roller 38, it will force the arm 32 toward the position shown in Figure 9, thereby causing the pusher pawl 33 to revolve the ratchet wheel 22 in the direction shown by the arrow. Each revolution of the eccentric cam 30 will move the wheel 22 the distance of one tooth, while the retaining pawl 39 will keep the wheel in an arrested position.

A knurled nut 42 is threadedly engaged with the outer end of shaft 15 on dial disc 16, and many be manually revolved to set the dial disc 16 in any predetermined or desirable position. The line 41 may be frictionally engaged with the flanged pulley as it passes from the fishing reel (not shown), and guided by a notch 43 in the lower surface of a guide arm 44, fastened by means of attaching screws 45 to the outer face of the shell 11, as shown in Figure 1.

The operation is as follows: The device may be clamped at 26 to a fishing pole (not shown), and engaged with the fishing line 41 in the manner illustrated. The line may be wound about a fishing reel (not shown).

When a sounding is to be made, the fishing line may be passed or threaded over the pulley 29 and guided in the open slot 43 of the arm 44. As the pulley 29 is revolved by the fishing line, the eccentric cam 30 revolves and the high point of the cam 30 contacts the roller 38 on the lever arm 32, causing the arm 32 to pivot at 31, pushing the pawl 33 in contact with the teeth of the ratchet wheel 22. This will cause the wheel 22 to be moved one tooth at a time, turning the dial 16, which has the numerals 17 showing through the opening 13 in the shell 11. The pawl 39 holds the ratchet wheel 22 against rotation in the opposite direction. The dial 16 may be revolved manually by the adjusting nut 42 to reset the device. The primary function of the device is to determine how many feet of line passes over the pulley 29, the dial being calibrated so that each successive numeral on the dial 17 is moved into the aperture 13 for every foot of line passed over the pulley 29.

When the sounding is completed, the fishing line may again be removed from the pulley 29 and guide slot 43, so that fishing can be resumed in the usual manner.

Although I have shown and described a certain embodiment of my invention, it will be understood that various changes and modifications may be made without departing from the spirit and scope of the invention as defined by the appended claims.

I claim:

1. In a depth gauge for fishing rods or the like, a circular casing having an aperture adjacent its periphery, a dial rotatably mounted in said casing having calibrations about its periphery successively visible through the aperture in said casing, a ratchet wheel rotatable with said dial, a shaft coaxial with said dial and extending through said casing, a pulley fixed on said shaft outside of said casing, a cam member fixed on said shaft inside said casing, a rocking arm mounted inside said casing having means thereon for engaging said cam member, a spring-pressed pawl on said arm for engaging the teeth on said ratchet wheel to rotate the dial in one direction, and an auxiliary spring-pressed pawl in said casing in engagement with said ratchet teeth to restrain rotation of said dial in the opposite direction, whereby said pulley may be frictionally engageable by a fish line to bring successive calibrations on the dial into view corresponding to the length of line passed over said pulley.

2. The structure of claim 1, wherein the casing has a guide arm projecting therefrom with a guide notch in alignment with the plane of rotation of the pulley.

2. The structure of claim 1, wherein the circular casing includes a flanged outer member with the aperture formed in the flange thereof, and the dial is also flanged and nested in said casing with the calibrations formed about the flange of said dial.

4. The structure of claim 3, wherein the flanged outer member is closed by a back plate, and the casing has a bracket attached thereto adapted for detachable mounting on a fishing rod in position for the fishing line to be passed over a pulley on the exterior of said casing.

5. The structure of claim 4, wherein the rocking arm and the auxiliary pawl are mounted on the back plate.

6. In a depth gauge for fishing rods or the like, a circular casing, a dial rotatable on a shaft concentric with said casing, a ratchet wheel mounted for rotation with said dial, a pulley fixed on a second shaft exteriorly of said casing, a cam member fixed on said second shaft inside said casing, said second shaft being coaxial with said first shaft and being rotatable with respect to said first shaft, a rocking arm mounted inside said casing having means thereon for engaging said cam member, a spring-pressed pawl on said arm for engaging the teeth on said ratchet wheel to rotate the dial in one direction and calibration means on the periphery of said dial cooperating with means on said casing to indicate the length of line passed over said pulley.

No references cited.